United States Patent
Lev et al.

(10) Patent No.: US 11,704,410 B2
(45) Date of Patent: *Jul. 18, 2023

(54) SYSTEM AND METHOD FOR DETECTING SUSPICIOUS ACTIONS OF A SOFTWARE OBJECT

(71) Applicant: NEC Corporation Of America, Herzlia (IL)

(72) Inventors: Tsvi Lev, Tel-Aviv (IL); Yaacov Hoch, Ramat-Gan (IL)

(73) Assignee: NEC Corporation Of America, Herzlia (IL)

( * ) Notice: Subject to any disclaimer, the term of this patent is extended or adjusted under 35 U.S.C. 154(b) by 100 days.

This patent is subject to a terminal disclaimer.

(21) Appl. No.: 17/324,142

(22) Filed: May 19, 2021

(65) Prior Publication Data

US 2021/0279333 A1 Sep. 9, 2021

Related U.S. Application Data

(63) Continuation of application No. 16/217,062, filed on Dec. 12, 2018, now Pat. No. 11,023,583.

(Continued)

(51) Int. Cl.
*G06F 21/56* (2013.01)
*G06F 21/55* (2013.01)
(Continued)

(52) U.S. Cl.
CPC ........ *G06F 21/566* (2013.01); *G06F 11/3438* (2013.01); *G06F 11/3664* (2013.01);
(Continued)

(58) Field of Classification Search
CPC .... G06F 21/566; G06F 21/554; G06F 21/552; G06F 21/05; G06F 21/03; G06F 11/3664;
(Continued)

(56) References Cited

U.S. PATENT DOCUMENTS 9,117,079 B1 * 8/2015 Huang ................ G06F 9/44505
9,626,509 B1 4/2017 Khalid et al.
(Continued)

FOREIGN PATENT DOCUMENTS

WO WO 2019/123450 6/2019

OTHER PUBLICATIONS

International Preliminary Report on Patentability dated Jul. 2, 2020 From the International Bureau of WIPO Re. Application No. PCT/IL2018/051349. (7 Pages).
(Continued)

*Primary Examiner* — Khoi V Le (57) ABSTRACT

A system for detecting malicious software, comprising at least one hardware processor adapted to: execute a tested software object in a plurality of computing environments each configured according to a different hardware and software configuration; monitor a plurality of computer actions performed in each of the plurality of computing environments when executing the tested software object; identify at least one difference between the plurality of computer actions performed in a first of the plurality of computing environments and the plurality of computer actions performed in a second of the plurality of computing environments; and instruct a presentation of an indication of the identified at least one difference on a hardware presentation unit.

17 Claims, 4 Drawing Sheets

Related U.S. Application Data (60) Provisional application No. 62/607,371, filed on Dec. 19, 2017.

(51) Int. Cl.
*G06F 21/53* (2013.01)
*G06F 11/36* (2006.01)
*G06F 11/34* (2006.01)

(52) U.S. Cl.
CPC ...... *G06F 11/3672* (2013.01); *G06F 11/3696* (2013.01); *G06F 21/53* (2013.01); *G06F 21/552* (2013.01); *G06F 21/554* (2013.01); *G06F 11/3414* (2013.01); *G06F 2201/865* (2013.01); *G06F 2221/033* (2013.01)

(58) Field of Classification Search
CPC ............. G06F 11/3696; G06F 11/3438; G06F 11/3672; G06F 11/3414; G06F 11/3688; G06F 2221/033; G06F 2201/865
See application file for complete search history.

(56) References Cited

U.S. PATENT DOCUMENTS

| | | | |
|---|---|---|---|
| 10,095,866 B2* | 10/2018 | Gong | G06F 21/577 |
| 2015/0244730 A1* | 8/2015 | Vu | G06F 21/566 726/24 |
| 2019/0188382 A1 | 6/2019 | Lev et al. | |

OTHER PUBLICATIONS

International Search Report and the Written Opinion dated Mar. 8, 2019 From the International Searching Authority Re. Application No. PCT/IL2018/051349. (13 Pages).

Notice of Allowance & Interview Summary dated Feb. 5, 2021 From the US Patent and Trademark Office Re. U.S. Appl. No. 16/217,062. (12 Pages).

Official Action dated Aug. 21, 2020 from the US Patent and Trademark Office Re. U.S. Appl. No. 16/217,062. (12 pages).

* cited by examiner

SYSTEM AND METHOD FOR DETECTING SUSPICIOUS ACTIONS OF A SOFTWARE OBJECT

RELATED APPLICATIONS

This application is a continuation of U.S. patent application Ser. No. 16/217,062 filed on Dec. 12, 2018, which claims the benefit of priority under 35 USC § 119(e) of U.S. Provisional Patent Application No. 62/607,371 filed on Dec. 19, 2017. The contents of the above application are all incorporated by reference as if fully set forth herein in its entirety.

BACKGROUND OF THE INVENTION

The present invention, in some embodiments thereof, relates to detecting suspicious computer actions of a software object and, more specifically, but not exclusively, to detecting malicious computer actions of a software object.

It is an increasingly known case for a software object, executed by a computer based system or device, to act against interests of a user of the executing system or device. Such a software object is commonly referred to as malicious software, or malware. Some malicious software objects are computer applications or scripts. Some other malicious software objects are dynamically loaded libraries or application add-ons or application plug-ins. Some other malicious software objects are executed following access to a web site. The user may be a person or an organization. As used henceforth, an attacker is an entity—a person or organization—involved in the creation and distribution of a malicious software object. In addition or alternately, as used henceforth an attacker is an entity attempting to benefit from execution of a malicious software object.

A malicious software object (malware) may mislead the user of its true intent and act secretly against the interests of the user, for example by gathering information about the user without their knowledge and possibly sending such information to another entity, such as another person or another organization, without the user's consent. Some malware allows an attacker to access a users' personal information such as banking information, passwords, or personal identity (for example an Internet Protocol address). Some malware causes harm to a network, for example by consuming bandwidth. Some malware corrupts or modifies one or more files on digital storage of a computer. Some malware asserts control over a device or a computer without the user's consent, and sometimes even without the user's knowledge.

A persistent problem in the field of cyber security is detecting when a software object performs computer actions for malicious purposes.

SUMMARY OF THE INVENTION

It is an object of the present invention to provide a system and a method for detecting suspicious computer actions of a software object.

The foregoing and other objects are achieved by the features of the independent claims. Further implementation forms are apparent from the dependent claims, the description and the figures.

According to a first aspect of the invention, a system for detecting malicious software comprises at least one hardware processor adapted to: execute a tested software object in a plurality of computing environments each configured according to a different hardware and software configuration; monitor a plurality of computer actions performed in each of the plurality of computing environments when executing the tested software object; identify at least one difference between the plurality of computer actions performed in a first of the plurality of computing environments and the plurality of computer actions performed in a second of the plurality of computing environments; and instruct a presentation of an indication of the identified at least one difference on a hardware presentation unit.

According to a second aspect of the invention, a method for detecting malicious software comprises: executing on at least one hardware processor a tested software object in a plurality of computing environments each configured according to a different hardware and software configuration; monitoring a plurality of computer actions performed in each of the plurality of computing environments when executing the tested software object; identifying at least one difference between the plurality of computer actions performed in a first of the plurality of computing environments and the plurality of computer actions performed in a second of the plurality of computing environments; and instructing a presentation of an indication of the identified at least one difference on a hardware presentation unit. Comparing computer actions performed in more than one computing environment each configured according to a different hardware and software configuration may identify one or more suspicious computer actions and thus may help expose malicious software.

With reference to the first and second aspects, in a first possible implementation of the first and second aspects of the present invention, the first computing environment of the plurality of computing environments comprises executing a first identified operating system, the second computing environment of the plurality of computing environments comprises executing a second identified operating system, and the first identified operating system is different from the second identified operating system. Some malicious software is designed to exploit one or more known vulnerabilities of a certain operating system and thus performs different computer actions when executed in the certain operating system than when executed in another operating system.

With reference to the first and second aspects, in a second possible implementation of the first and second aspects of the present invention, at least one of the plurality of computing environments comprises executing the tested software object by a virtual machine executed by at least one of the at least one hardware processor. Optionally, the first computing environment of the plurality of computing environments comprises executing the tested software object by a virtual machine executed by at least one of the at least one hardware processor, and the second computing environment of the plurality of computing environments does not comprise a virtual machine executed by the at least one hardware processor. Some malicious software is designed to refrain from performing malicious computer actions when executed on a virtual machine and thus performs different computer actions when executed on a virtual machine than when executed on a physical machine.

With reference to the first and second aspects, in a third possible implementation of the first and second aspects of the present invention, the first computing environment of the plurality of computing environments comprises executing a first version of an identified operating system, the second computing environment of the plurality of computing environments comprises executing a second version of the identified operating system, and the first version of the identified operating system is different from the second version of the operating system. Some malicious software is designed to exploit one or more known vulnerabilities of a certain version of an operating system and thus performs different computer actions when executed in the certain version of the operating system than when executed in another version of the operating system. Some vendor-approved software is designed to execute only on a certain version of an operating system and thus performs different computer actions when executed in the certain version of the operating system than when executed in another version of the operating system.

With reference to the first and second aspects, in a fourth possible implementation of the first and second aspects of the present invention, the system further comprises a digital data networking device. In the first computing environment of the plurality of computing environments at least one of the at least one hardware processor is connected to the digital data networking device, and in the second computing environment of the plurality of computing environments the at least one hardware processor is not connected to the digital data networking device. Optionally, the digital data networking device is connected to a local area digital data network. Optionally, the digital data networking device is connected to a public digital data network. Optionally, the public digital data network is the Internet. Some malicious software depends on network connectivity to performing malicious computer actions and thus performs different computer actions when executed on a hardware processor connected to a digital data networking device than when executed on a hardware processor not connected to a digital data networking device.

With reference to the first and second aspects, in a fifth possible implementation of the first and second aspects of the present invention, the first computing environment of the plurality of computing environments comprises configuring a first operating system with a first date and time of day, the second computing environment of the plurality of computing environments comprises configuring a second operating system with a second date and time of day, the first date and time of day is different from the second date and time of day. Some malicious software is designed to perform malicious computer actions only on certain days of the week or at certain times of a day.

With reference to the first and second aspects, in a sixth possible implementation of the first and second aspects of the present invention, the first computing environment of the plurality of computing environments comprises executing at least one software program selected from a plurality of identified software programs, and the at least one software program is not executed in the second computing environment of the plurality of computing environments. Some malicious software is designed to exploit one or more known vulnerabilities of a certain software program and thus performs different computer actions when executed in an environment executing the certain software program than when executed in an environment not executing the certain software program.

With reference to the first and second aspects, in a seventh possible implementation of the first and second aspects of the present invention, the plurality of computer actions comprises at least one action selected from a group of actions consisting of: sending a message on a digital data network, receiving a message via a digital data network, reading a digital memory, modifying a content of a digital memory, reading from a digital storage, writing to a digital storage, erasing from a digital storage, instructing activation of a software program, instructing termination of a software program, instructing activation of a software process, instructing termination of a software process, instructing a system restart, sending a message to an executed software program using an inter process communication method as known in the art, instructing an operating system operation via an application programming interface command, performing a computation utilizing a central processor unit (CPU) more than an identified threshold CPU-utilization value, and delivering digital data or a signal to a hardware device connected to the at least one hardware processor. Optionally, the hardware device is a visual display device or an audio device. Optionally, the identified difference comprises one or more differences selected from a group of differences consisting of: a difference in data included in the message sent on the digital network, and a difference in data included in the message received on the digital network.

Optionally, the plurality of computer actions performed in the first of the plurality of computing environments comprises at least one identified computer action, and the plurality of computer actions performed in the second of the plurality of computing environments does not comprise the at least one identified computer action.

With reference to the first and second aspects, in an eighth possible implementation of the first and second aspects of the present invention, the hardware presentation unit is a visual display device. Optionally, instructing the presentation comprises sending a message indicative of the identified at least one difference to an identified hardware device. Optionally, the identified hardware device is a computer, a mobile phone or a mobile computerized device.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to detecting suspicious computer actions of a software object and, more specifically, but not exclusively, to detecting malicious computer actions of a software object.

Detecting when a software object performs illegitimate computer actions is complex as software objects may perform thousands of computer actions. Computer actions include instructing an operating system operation via an Application Programming Interface (API) command, file operations such as creating, reading, modifying and deleting a file on digital storage, communication with other entities including sending and receiving one or more messages using a digital data communication network, performing a computation utilizing a central processor unit (CPU) more than an identified threshold CPU-utilization value, updating an operating system's registry and updating a device's firmware. A malicious software object, having a stated purpose and behavior, may perform one or more computer actions that are not required for the stated purpose and behavior. These non-required computer actions may be malicious, sometimes exposing sensitive information to an unauthorized audience or disrupting correct operation of a computer system or device. Thus, there is a need to protect computer systems and devices from executing malware.

Some malware may perform malicious computer actions during installation of the malware. Some practices for preventing installation and execution of malware on a sensitive device or system comprise testing the software object before installation on the sensitive device or system. In such cases, a tested software object is executed in a system or device emulating the real sensitive system of device. There, any damage done will not affect the real sensitive device or system. In such practices, the system or device's state may be monitored and analyzed to detect unwanted an unwanted state, for example modification of a file's contents, a system reboot or termination or creation of a process. In addition or alternately, a plurality of computer actions performed by the tested software object may be monitored and classified as either legitimate or suspect. Detecting unwanted states and classifying the plurality of computer actions may require complex analysis and may require defining and maintaining a set of rules describing what constitutes malicious activity. As computers develop and evolve, there may be a need to add new rules continuously, and it may be the case that the need for new rules is discovered only after malware, undetected by an existing practice, causes damage in a sensitive device or system.

The present invention, in some embodiments thereof, proposes simplifying the analysis of a tested software object's computer actions by executing the tested software object in multiple computing environments, monitoring the tested software object's computer actions when executed in each of the multiple computing environments and identifying one or more differences between the plurality of computer actions performed in a first computing environment and the plurality of computer actions performed in a second computing environment. The multiple computing environments are each configured according to a different hardware and software configuration, where differences between the multiple computing environments should not affect the tested software object's stated purpose and behavior. As differences between the multiple computing environments should not affect the behavior of the tested software object, any differences in computer actions performed by the tested software object in the different computing environments may indicate undocumented, unexpected and potentially malicious behavior.

Using multiple different computing environments facilitates exposing malicious actions possible only under some identified conditions. For example, there may be a software object stating no requirements for access to a public data communication network such as the Internet. A single-player game is one possible example of such a software object. However, if such a software object comprises an undocumented configuration to use a public data communication network for malicious purposes there may be a difference in contents of network packets sent by the software object in different computing environments.

In another example, a software object may be adapted to identify when it is executed by a virtual machine and not a physical computer. A software object may be adapted to classify execution by a virtual machine as a test environment and refrain from performing any malicious activities in case the software object's actions are being monitored and analyzed. Executing the same software object on a physical computer may result in the software object performing additional computer actions not performed when executing on the virtual machine.

Other possible malicious computer actions may be performed when a software object is executed in software configuration comprising a certain operating system, a certain version of an operating system, a certain patch level, or service pack, of an operating system, a certain application such as a certain web browser, or a certain text editor, or a certain application plugin, for example Adobe Flash. Such a software object may be adapted to exploit one or more vulnerabilities of the certain operating system, operating system version, patch level, application or application plugin.

Alternately, when a software object is adapted to exploit one or more vulnerabilities of a certain operating system, operating system version, patch level, application or application plugin, executing the tested software in a computing environment comprising another certain patch level may result in the software object not performing any malicious computer actions. In yet another example, a vendor approved software object, unlike some freely available software objects, for example software objects available on the Internet, is typically compatible only with one or more identified operating system versions and/or identified computing environment configurations. When a software object is executed in a computing environment deviating from the identified computing environment configurations, the software object is expected to issue an error and stop executing. A malicious software object may continue executing on a greater amount of operating systems and computing environment configurations.

Executing the tested software object in multiple computing environments differing in software configuration may lead to the tested software object performing different computer actions in each of the multiple computing environments, depending on available vulnerabilities.

Using a differential approach, that is identifying a suspicious software object by identifying a difference between the plurality of computer actions performed by the tested software object in a first computing environment and the plurality of computer actions performed by the tested software object in a second computing environment eliminates the need to define and maintain rules for what constitutes malicious activity, simplifying analysis and increasing reliability by being less susceptible to human errors. In addition, a rule-based malware detection solution is sensitive to a time gap between introduction of a new malicious action and updating the rules to accommodate the new malicious action. Some embodiments of the present invention, by using the differential approach, are not sensitive to specific action details and may thus be more reliable than a rule-based solution.

When a difference in computer actions performed by the tested software object in multiple different computing environments is detected, in some embodiments of the present invention an indication of the detected difference is presented to a user, flagging the tested software object as suspicious of being malicious.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
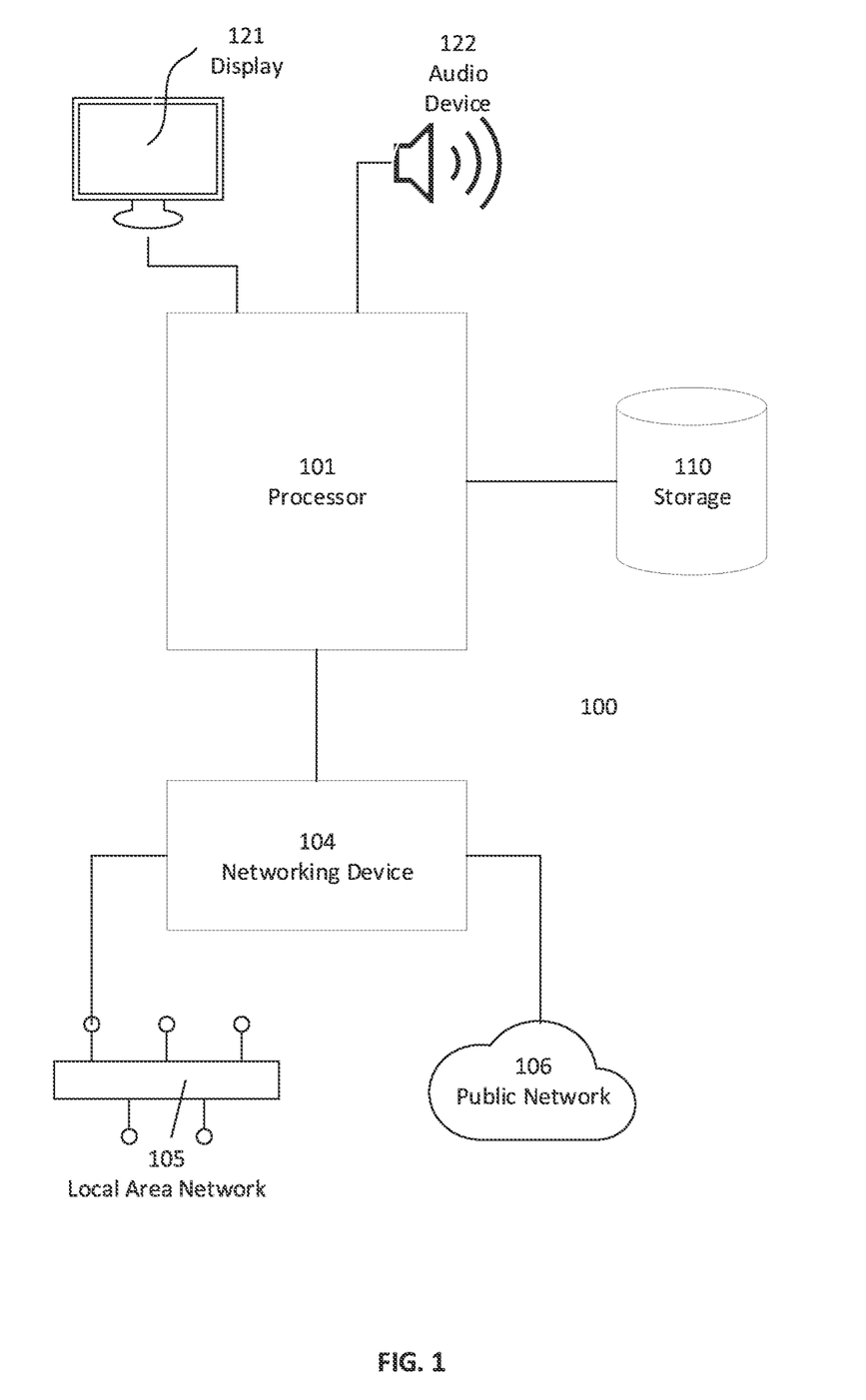
FIG. 1 is a schematic block diagram of an exemplary system, according to some embodiments of the present invention.

Reference is now made to FIG. 1, showing a schematic block diagram of an exemplary system 100, according to some embodiments of the present invention. In such embodiments, at least one hardware processor 101 is adapted to execute a tested software object in a plurality of computing environments, each configured according to a different hardware and software configuration. Optionally, at least one hardware processor 101 is electrically coupled with digital memory, for example Random Access Memory (RAM). Optionally, at least one hardware processor 101 is connected to at least one digital storage 110, for example a hard disk. Optionally, at least one hardware processor is connected to at least one digital data networking device 104. A digital data networking device may be a networking switch or a networking router.

Optionally, at least one digital data networking device 104 is connected to a local area digital data network (LAN) 105, for example an Ethernet LAN. Optionally, at least one digital data networking device 104 is connected to a public digital data network 106, wherein anyone has access and through network 106 can connect to other networks. Optionally, the public digital data network is the Internet. Optionally, at least one digital data networking device 104 is a wireless network access point.

Optionally, at least one hardware processor 101 is connected to one or more hardware devices, for example visual display device 121 and audio device 122. Examples of a visual display device are a computer monitor and a computer screen. An example of an audio device is an audio speaker. At least one hardware device may be a hardware presentation unit, for example video display device 121. Optionally, at least one hardware processor 101 sends one or more messages to an identified hardware device such as a computer, a mobile phone or a mobile computerized device, optionally using at least one digital data networking device 104.

Figure 2:
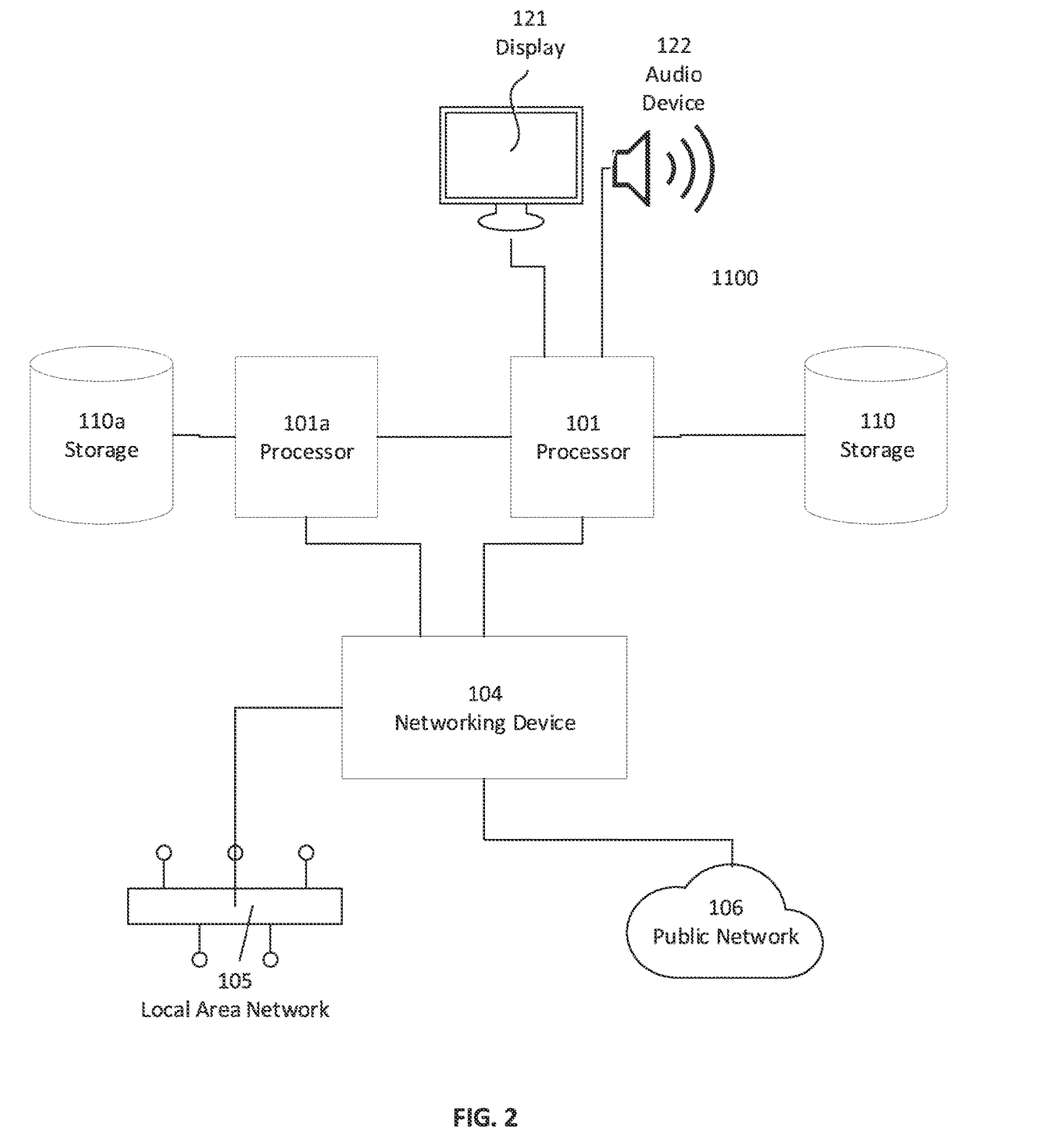
FIG. 2 is a schematic block diagram of a second exemplary system comprising more than one hardware processor, according to some embodiments of the present invention.

In some embodiments of the present invention, a first of the plurality of computing environments comprises executing the tested software object on at least one hardware processor and a second of the plurality of computing environments comprises executing the tested software object on at least one other hardware processor, for example in order to monitor a plurality of computer actions performed on two hardware processors operating at different clock rates, or manufactured by different manufacturers. Such embodiments comprise more than one hardware processor. Reference is now made also to FIG. 2, showing a schematic block diagram of a second exemplary system 1100 comprising more than one hardware processor, according to some embodiments of the present invention. In such embodiments, the system comprises at least one hardware processor 101 and at least one other processor 101a.

At least one other hardware processor 101a is optionally connected to at least one other digital storage 110a, for example another hard disk. Optionally, at least one hardware processor 101 and at least one other hardware processor 101a are connected to a common storage, for example a network storage. Optionally, at least one other hardware processor is connected to at least one networking device 104. Optionally, at least one hardware processor 101 and at least one other hardware processor 101a are connected, for example for the purpose of monitoring a plurality of computer actions performed in at least one hardware processor 101 and at least one other hardware processor 101a. At least one hardware processor 101 and at least one other hardware processor 101a may be connected via at least one networking device 104. Optionally, at least one hardware processor 101 and at least one other hardware processor 101a are connected via another networking device.

Optionally, at least one of the plurality of computing environments comprises executing the tested software object by a virtual machine (VM) executed by at least one hardware processor 101, and at least one other of the plurality of computing environments comprises executing the tested software object by at least one other hardware processor 101a, where at least one other hardware processor 101a is configured to not execute a VM. Examples of a virtual machine are an Oracle VM VirtualBox VM, a VMWare Workstation VM, and a Microsoft Windows Virtual PC VM. Optionally, at least one visual display 121 and/or at least one audio device 122 are connected to at least one hardware processor 101a.

Figure 3:
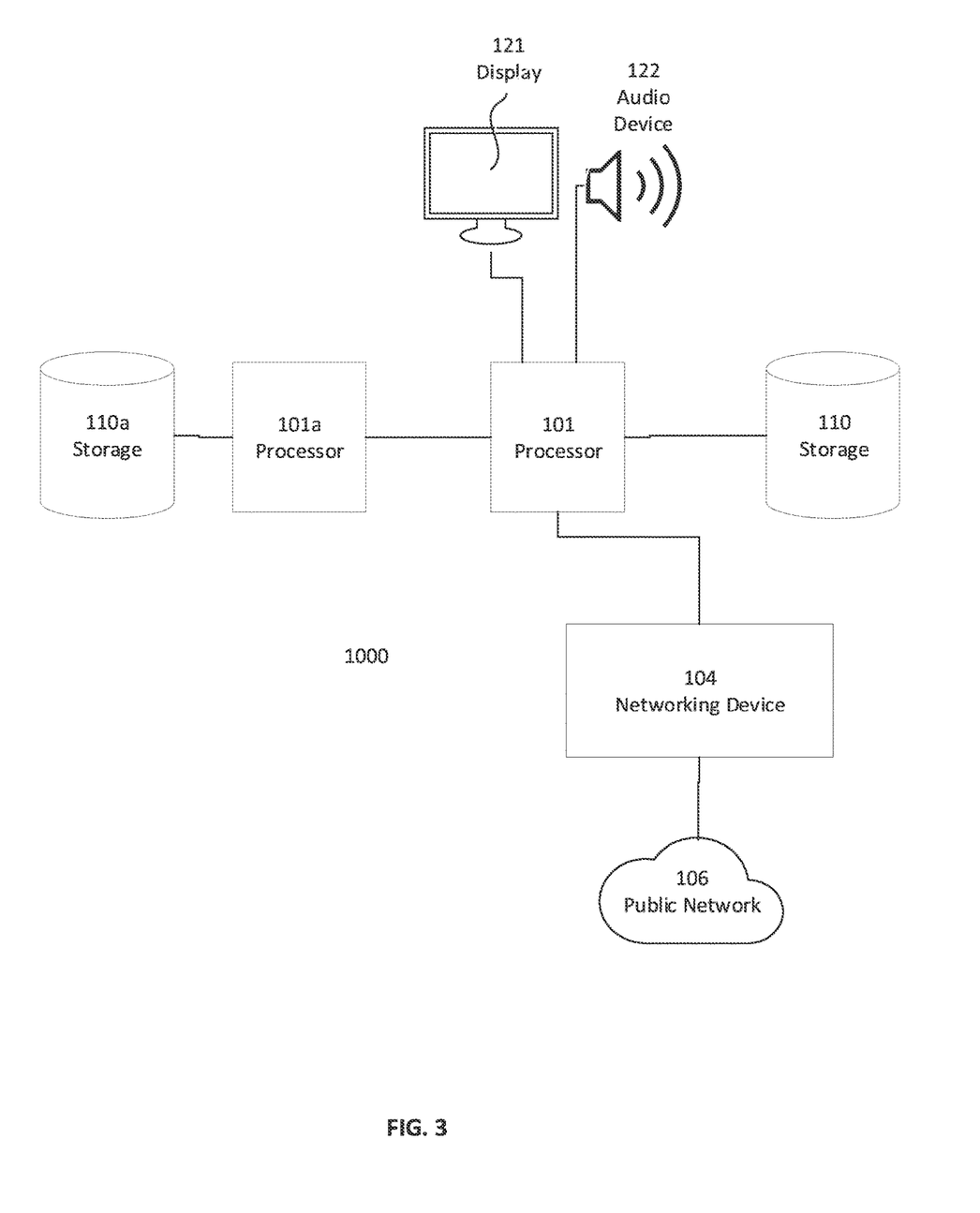
FIG. 3 is a schematic block diagram of a third exemplary system comprising a processor not connected to a networking device, according to some embodiments of the present invention.

In some embodiments of the present invention, at least one of the multiple computing environments comprises connecting at least one hardware processor to a digital data networking device, and at least one other of the multiple computing environments comprises not connecting the at least one hardware processor to a digital data networking device. Reference is now made also to FIG. 3, showing a schematic block diagram of a third exemplary system 1000 comprising a processor not connected to a networking device, according to some embodiments of the present invention. In such embodiments, at least one hardware processor is not configured to at least one networking device 104. At least one of the plurality of computing environments comprises executing the tested software object by at least one hardware processor 101, and at least one other of the plurality of computing environments comprises executing the tested software object by at least one hardware processor 101a. Optionally, at least one visual display 121 and/or at least one audio device 122 are connected to at least one hardware processor 101a.

To detect malicious software, in some embodiments of the present invention system 100, 1000 or 1100 implement the following optional method.

Figure 4:
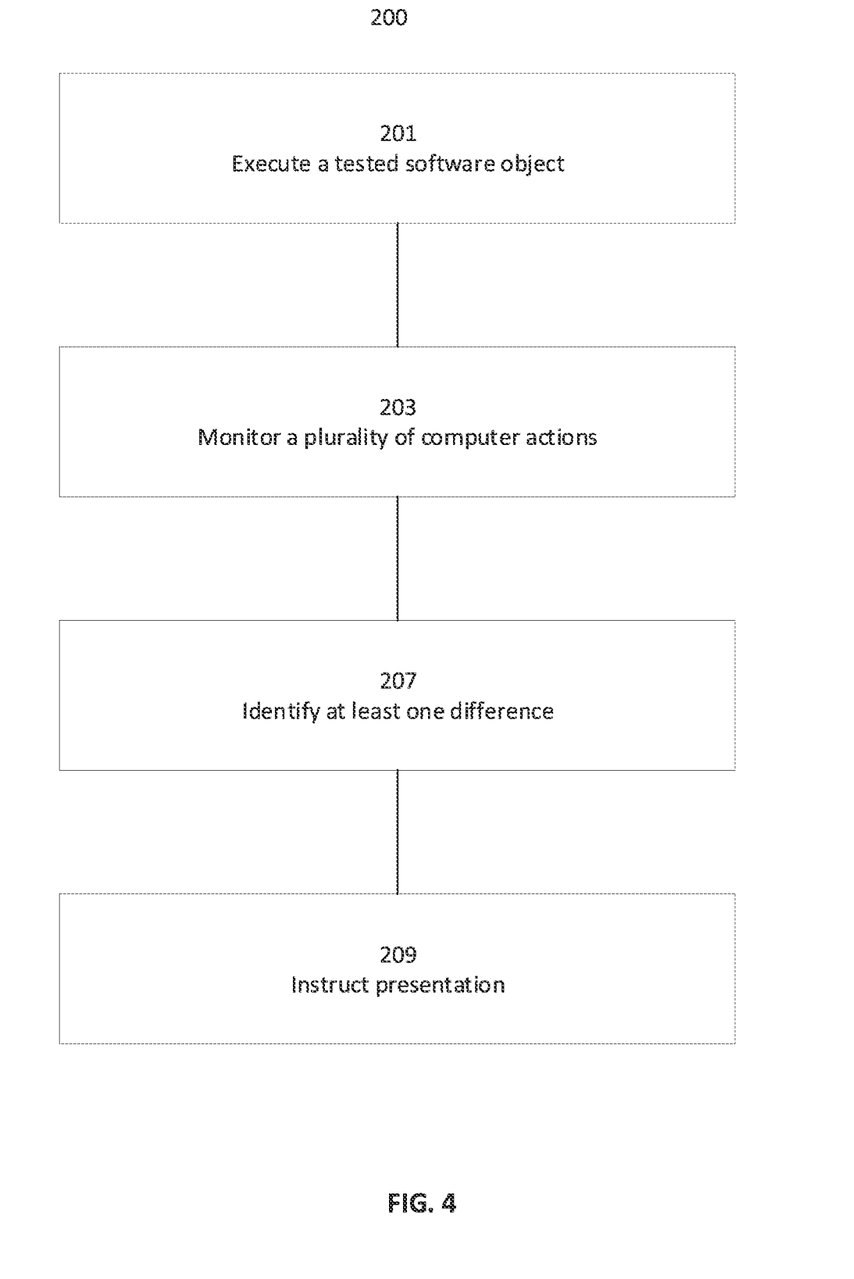
FIG. 4 is a flowchart schematically representing an optional flow of operations for detecting malicious software, according to some embodiments of the present invention.

Reference is now made also to FIG. 4, showing a flowchart schematically representing an optional flow of operations 200 for detecting malicious software, according to some embodiments of the present invention.

In such embodiments, in 201 at least one hardware processor 101 and/or at least one hardware processor 101a execute a tested software object in a plurality of computing environments, each configured according to a different hardware and software configuration. Optionally, at least one of the plurality of computing environments comprises executing the tested software object by a VM executed by at least one hardware processor 101 and/or at least one hardware processor 101a.

Optionally, a first computing environment of the plurality of computing environments comprises executing the tested software object by a VM executed by at least one hardware processor 101 and a second computing environment comprises configuring at least one hardware processor 101 to not execute a VM. Optionally, a first computing environment of the plurality of computing environments comprises executing the tested software object by a VM executed by at least one hardware processor 101 and a second computing environment comprises configuring at least one hardware processor 101a to not execute a VM.

Optionally, the first computing environment comprises executing a first identified operating system and the second computing environment comprises executing a second identified operating system, where the first identified operating system is different from the second identified operating system. Examples of operating systems are Microsoft Windows, a Linux distribution such as Debian or Ubuntu, and Android. Optionally, the first computing environment comprises executing a first version of an identified operating system and the second computing environment comprises executing a second version of the identified operating system, where the first version and the second version are different. In one example, the first computing environment comprises at least one hardware processor 101 executing Ubuntu version 14.04.4 and the second computing environment comprises at least one hardware processor 101 executing Ubuntu version 16.04.3. In another example, the first computing environment comprises at least one hardware processor 101 executing Microsoft Windows 7 and the second computing environment comprises at least one hardware processor 101 executing Windows 10. In yet another example, the first computing environment comprises at least one hardware processor 101 executing Microsoft Windows 7 with no service packs and the second computing environment comprises at least one hardware processor 101 executing Windows 7 with Service Pack 1. In yet another example, the first computing environment comprises at least one hardware processor 101 executing Microsoft Windows 10 with no security updates and the second computing environment comprises at least one hardware processor 101 executing Windows 10 with an identified security update. Optionally, the first computing environment comprises connecting at least one hardware processor 101 to at least one digital data networking device 104 and the second computing environment comprises not connecting at least one hardware processor 101 and/or at least one other hardware processor 101*a* to at least one digital data networking device 104.

Optionally, the first computing environment comprises configuring a first operating system executed by at least one hardware processor 101 and/or at least one hardware processor 101*a* with a first date and time of day, and the second computing environment comprises configuring a second operating system executed by at least one hardware processor 101 and/or at least one hardware processor 101*a* with a second date and time of day, where the first date and time of day is different from the second date and time of day. For example, a year of the first date and time of day may be different from a year of the second date and time of day.

Optionally, the first computing environment comprises executing at least one software program selected from a plurality of identified software programs and the at least one software program is not executed in the second computing environment. Examples of identified software programs are: Mozilla Firefox, Google Chrome, Microsoft Internet Explorer, Microsoft Edge, Microsoft Office, Microsoft Word, an Adobe Flash plugin for a web browser and Adobe PDF Reader.

In 203, at least one hardware processor 101 and/or at least one hardware processor 101*a* optionally monitors a plurality of computer actions performed in each of the plurality of computing environments when executing the tested software object. Examples of a computer action are: sending a message on a digital data network, receiving a message via a digital data network, reading a digital memory, modifying a content of a digital memory, reading from a digital storage, writing to a digital storage, erasing from a digital storage, instructing activation of a software program, instructing termination of a software program, instructing activation of a software process, instructing termination of a software process, instructing a system restart, sending a message to an executed software program using an inter process communication method as known in the art, instructing an operating system operation via an application programming interface command, and delivering digital data or a signal to a hardware device connected to at least one hardware processor 101. Optionally, the plurality of computer actions is monitored using monitoring tools as known in the art, for example Tripwire Enterprise. Some monitoring tools provide a list of modified files and a list of registry entries before and after the software object is executed.

Optionally, the hardware device is visual display device 121 or audio device 122.

In 207, at least one hardware processor 101 and/or at least one hardware processor 101*a* optionally identifies at least one difference between the plurality of computer actions performed in a first computing environment of the plurality of computing environments the plurality of computer actions performed in a second computing environment of the plurality of computer environments. Optionally, the identified difference comprises a difference in data included in a message sent on a digital data network or a difference in data included in a message received on the digital data network. Optionally, the identified difference comprises a difference in a digital memory location. Optionally, the plurality of computer actions performed in the first computing environment comprises at least one identified computer action and the plurality of computer actions performed in the second computing environment does not comprise the at least one identified computer action.

Next in 209, at least one hardware processor 101 and/or at least one hardware processor 101*a* optionally instructs a presentation of an indication of the identified at least one difference on a hardware presentation unit. Optionally, the at least one hardware presentation unit is a visual display device. Optionally, the hardware presentation unit is an audio device. Optionally, instructing the presentation comprises sending a message indicative of the identified at least one difference to an identified hardware device, for example an identified computer, and identified mobile phone or an identified mobile computerized device such as a tablet computer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant computer actions and computing environments will be developed and the scope of the terms "computer action" and "computing environment" is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for detecting malicious software, comprising:
    at least one hardware processor adapted to:
        execute a tested software object in a plurality of computing environments each configured according to a different hardware and software configuration;
        monitor a plurality of computer actions performed in each of the plurality of computing environments when executing the tested software object;
        identify at least one difference between the plurality of computer actions performed in a first of the plurality of computing environments and the plurality of computer actions performed in a second of the plurality of computing environments; and
        instruct a presentation of an indication of the identified at least one difference on a hardware presentation unit by sending a message indicative of the identified at least one difference to an identified hardware device;
    wherein at least one software program is selected from a plurality of identified software programs and is being executed in the first environment of the plurality of computing environments when said tested software object is being executed in the first environment, the at least one software program is not being executed in the second computing environment of the plurality of computing environments when the tested software object is being executed in the second computing environment; and the plurality of computer actions comprises at least one action selected from a group of actions consisting of: sending a message on a digital data network, receiving a message via a digital data network, reading a digital memory, modifying a content of a digital memory, reading from a digital storage, writing to a digital storage, erasing from a digital storage, instructing activation of a software program, instructing termination of a software program, instructing activation of a software process, instructing termination of a software process, instructing a system restart, sending a message to an executed software program using an inter process communication method as known in the art, instructing an operating system operation via an application programming interface command, performing a computation utilizing a central processor unit (CPU) more than an identified threshold CPU-utilization value, and delivering digital data or a signal to a hardware device connected to the at least one hardware processor.

2. The system of claim 1, wherein the first computing environment of the plurality of computing environments comprises executing a first identified operating system;
    wherein the second computing environment of the plurality of computing environments comprises executing a second identified operating system; and
    wherein the first identified operating system is different from the second identified operating system.

3. The system of claim 1, wherein at least one of the plurality of computing environments comprises executing the tested software object by a virtual machine executed by at least one of the at least one hardware processor.

4. The system of claim 1, wherein the first computing environment of the plurality of computing environments comprises executing a first version of an identified operating system;
    wherein the second computing environment of the plurality of computing environments comprises executing a second version of the identified operating system; and
    wherein the first version of the identified operating system is different from the second version of the operating system.

5. The system of claim 1, further comprising a digital data networking device;
    wherein in the first computing environment of the plurality of computing environments at least one of the at least one hardware processor is connected to the digital data networking device; and
    wherein in the second computing environment of the plurality of computing environments the at least one hardware processor is not connected to the digital data networking device.

6. The system of claim 5, wherein the digital data networking device is connected to a local area digital data network.

7. The system of claim 5, wherein the digital data networking device is connected to a public digital data network.

8. The system of claim 7, wherein the public digital data network is the Internet.

9. The system of claim 1, wherein the first of the plurality of computing environments comprises configuring a first operating system with a first date and time of day;
    wherein the second of the plurality of computing environments comprises configuring a second operating system with a second date and time of day; and
    wherein the first date and time of day is different from the second date and time of day.

10. The system of claim 3, wherein the first computing environment of the plurality of computing environments comprises executing the tested software object by a virtual machine executed by at least one of the at least one hardware processor; and wherein the second computing environment of the plurality of computing environments does not comprise a virtual machine executed by the at least one hardware processor.

11. The system of claim 1, wherein the hardware device is a visual display device or an audio device.

12. The system of claim 1, wherein the identified difference comprises one or more differences selected from a group of differences consisting of: a difference in data included in the message sent on the digital network, and a difference in data included in the message received on the digital network.

13. The system of claim 1, wherein the plurality of computer actions performed in the first of the plurality of computing environments comprises at least one identified computer action;
and the plurality of computer actions performed in the second of the plurality of computing environments does not comprise the at least one identified computer action.

14. The system of claim 1, wherein the hardware presentation unit is a visual display device.

15. The system of claim 1, wherein the identified hardware device is a computer, a mobile phone or a mobile computerized device.

16. A method for detecting malicious software, comprising:
executing on at least one hardware processor a tested software object in a plurality of computing environments each configured according to a different hardware and software configuration;
monitoring a plurality of computer actions performed in each of the plurality of computing environments when executing the tested software object;
identifying at least one difference between the plurality of computer actions performed in a first of the plurality of computing environments and the plurality of computer actions performed in a second of the plurality of computing environments; and
instructing a presentation of an indication of the identified at least one difference on a hardware presentation unit by sending a message indicative of the identified at least one difference to an identified hardware device;
wherein at least one software program is selected from a plurality of identified software programs and is being executed in the first environment of the plurality of computing environments when said tested software object is being executed in the first environment, the at least one software program is not being executed in the second computing environment of the plurality of computing environments when the tested software object is being executed in the second computing environment, and the plurality of computer actions comprises at least one action selected from a group of actions consisting of: sending a message on a digital data network, receiving a message via a digital data network, reading a digital memory, modifying a content of a digital memory, reading from a digital storage, writing to a digital storage, erasing from a digital storage, instructing activation of a software program, instructing termination of a software program, instructing activation of a software process, instructing termination of a software process, instructing a system restart, sending a message to an executed software program using an inter process communication method as known in the art, instructing an operating system operation via an application programming interface command, performing a computation utilizing a central processor unit (CPU) more than an identified threshold CPU-utilization value, and delivering digital data or a signal to a hardware device connected to the at least one hardware processor.

17. The method of claim 16, wherein the first of the plurality of computing environments comprises configuring a first operating system with a first date and time of day;
wherein the second of the plurality of computing environments comprises configuring a second operating system with a second date and time of day; and
wherein the first date and time of day is different from the second date and time of day.

* * * * *